United States Patent [19]

Maye et al.

[11] Patent Number: 5,624,701
[45] Date of Patent: Apr. 29, 1997

[54] SOLID SALTS OF HOP ACIDS

[76] Inventors: John P. Maye, 3057 S. Wentworth Ave., Milwaukee, Wis. 53207; Scot W. Weis, 3287 N. 47th St., Milwaukee, Wis. 53216

[21] Appl. No.: 474,848

[22] Filed: Jun. 7, 1995

Related U.S. Application Data

[62] Division of Ser. No. 336,961, Nov. 10, 1994.

[51] Int. Cl.$^6$ ............................................. C12C 3/00
[52] U.S. Cl. ............................................. 426/600; 568/347
[58] Field of Search ........................... 426/600; 568/347

[56] References Cited

U.S. PATENT DOCUMENTS

| | | | |
|---|---|---|---|
| 3,552,975 | 1/1971 | Worden et al. | 426/600 |
| 3,607,300 | 9/1971 | Mitchell et al. | 99/50.5 |
| 3,973,052 | 8/1976 | Mitchell | 426/600 |
| 4,002,683 | 1/1977 | Todd | 426/600 |
| 4,340,763 | 7/1982 | Wuestoff | 568/344 |
| 4,918,240 | 4/1990 | Todd et al. | 426/600 |
| 5,200,227 | 4/1993 | Guzinski et al | 426/600 |
| 5,478,580 | 12/1995 | Foster | 426/600 |

*Primary Examiner*—James H. Reamer
*Attorney, Agent, or Firm*—Ronald S. Courtney

[57] ABSTRACT

The present invention is directed to solid salts of hop acids and to processes for their production. Preferred are solid sodium and potassium salts of isoalpha acids rho-isoalpha acids, tetrahydroisoalpha acids, hexahydroisoalpha acids and beta acids.

17 Claims, No Drawings

5,624,701

SOLID SALTS OF HOP ACIDS

This is a division of application Ser. No. 08/336,961, filed on Nov. 10, 1994.

BACKGROUND OF THE INVENTION

The present invention relates to solid salts of hop acids. More particularly, it relates to solid sodium and potassium salts of hop acids.

Hops have been used for centuries to flavor beer and are considered, along with water, yeast and malt, to be an essential ingredient. Since the sixties, following elucidation of the structure of the hop bittering compounds in the fifties by Rigby and Verzele, various forms of modified hop extracts have found their way into commercial applications.

A goal of present brewing technology is to make reproducible brews. Difficulties are encountered at every step in the brewing process: unwanted variations in yeast cultures, in hops, in malt, in adjuncts, and even in times, temperatures and the human element of the brewhouse. Beer presents a subtle combination of carbonation, foam, mouth feel, bitterness and aroma when tasted and swallowed. Whatever can be done to improve the reproducibility and control of even one variable—yeast, hops, malt, adjuncts—is exceptionally important.

Hop flavors have attracted widespread interest in recent years for use in controlling and standardizing the flavoring of beer and ale especially through the use of post-fermentation injection techniques.

U.S. Pat. No. 4,340,763 issued Jul. 20, 1982 refers to a process for producing hulupones by oxidizing lupulones in an aqueous, alkaline medium and precipitating out the hulupones as the sodium or potassium salt.

U.S. Pat. No. 4,002,683 issued Jan. 11, 1971 refers to a process for transforming an alpha acid into an iso-alpha acid by contacting the alpha acid with an aqueous solution of a metal salt, with preferred metal salts being calcium and magnesium.

U.S. Pat. No. 5,013,571 issued May 7, 1991 refers to a process for converting alpha acids to hop flavors by exposing the alpha acids to an environment capable of simultaneously isomerizing and reducing the alpha acids to tetrahydroisoalpha acids or hexahydroisoalpha acids.

U.S. Pat. No. 5,013,572 issued May 7, 1991 refers to a method of purifying tetrahydroisoalpha acids and hexahydroisoalpha acids by steam stripping the impurities.

U.S. Pat. No. 4,918,240 refers to a method for removing hydrogenation catalyst impurities from beta acids.

SUMMARY OF THE INVENTION

In one embodiment, the present invention is directed to a solid potassium salt of a hop acid, provided said hop acid is not an alpha acid or a hulupone.

In another embodiment, the present invention is directed to a solid sodium salt of a hop acid, provided said hop acid is not an alpha acid or a hulupone.

Preferred solid potassium salts or solid sodium salts are salts of isoalpha acids, rho-isoalpha acids, tetrahydroisoalpha acids, hexahydroisoalpha acids, and beta acids.

In yet another embodiment, the present invention is directed to a solid salt of a hop acid wherein said hop acid is selected from the group consisting of isoalpha acids, rho-isoalpha acids, tetrahydroisoalpha acids and hexahydroisoalpha acids and said solid salt is selected from the group consisting of calcium and magnesium salts.

In still another embodiment, the present invention is directed to a blend of solid salts of hop acids wherein said hop acid is selected from the group consisting of isoalpha acids, rho-isoalpha acids, tetrahydroisoalpha acids, hexahydroisoalpha acids and beta acids, and wherein said solid salt is selected from the group consisting of potassium, sodium, calcium and magnesium salts.

In another embodiment, the present invention is directed to a process for the production of the solid potassium salt of a hop acid provided said hop acid is not an alpha acid or a hulupone comprising (a) heating an aqueous alkaline solution of a hop acid;
(b) adding an aqueous solution of a potassium salt or a solid potassium salt to obtain an organic layer;
(c) separating the organic layer; and
(d) drying the organic layer to obtain the solid potassium salt.

Preferred is the process wherein said hop acid is selected from the group consisting of isoalpha acids, rho-isoalpha acids, tetrahydroisoalpha acids, hexahydroisoalpha acids and beta acids.

Also preferred is the process wherein said potassium salt is selected from the group consisting of potassium carbonate, potassium chloride and potassium bicarbonate.

Also preferred is the process wherein the drying of step (d) is accomplished by a method selected from the group consisting of spray drying, vacuum drying, drum drying, pan drying, rotary drying, freeze drying and combinations thereof.

In yet another embodiment, the present invention is directed to a process for the production of the solid sodium salt of a hop acid provided said hop acid is not an alpha acid or a hulupone comprising (a) heating an aqueous alkaline solution of a hop acid;
(b) adding an aqueous solution of a sodium salt or a solid sodium salt to obtain an organic layer;
(c) separating the organic layer; and
(d) drying the organic layer to obtain the solid sodium salt.

Preferred is the process wherein said hop acid is selected from the group consisting of isoalpha acids, rho-isoalpha acids, tetrahydroisoalpha acids, hexahydroisoalpha acids and the beta acids.

Also preferred is the process wherein said sodium salt is selected from the group consisting of sodium chloride, sodium carbonate and sodium bicarbonate.

Also preferred is the process wherein the drying of step (d) is accomplished by a method selected from the group consisting of spray drying, vacuum drying, drum drying, pan drying, rotary drying and freeze drying; and combinations thereof.

In still another embodiment, the present invention is directed to a process for the production of the solid calcium salt of a hop acid provided said hop acid is not a beta acid comprising (a) heating an aqueous alkaline solution of a hop acid;
(b) adding an aqueous solution of a calcium salt or a solid calcium salt to obtain an organic layer or a precipitate;
(c) separating the organic layer or precipitate; and
(d) drying the organic layer or precipitate to obtain the solid calcium salt.

Preferred is the process wherein said hop acid is selected from the group consisting of isoalpha acids, rho-isoalpha acids, tetrahydroisoalpha acids, and hexahydroisoalpha acids.

Also preferred is the process wherein said calcium salt is selected from the group consisting of calcium carbonate and calcium chloride.

Preferred is the process wherein the drying of step (d) is accomplished by a method selected from the group consisting of spray drying, vacuum drying, drum drying, pan drying, rotary drying and freeze drying and combinations thereof.

In yet still another embodiment, the present invention is directed to a process for the production of the solid magnesium salt of a hop acid provided said hop acid is not a beta acid comprising (a) heating an aqueous alkaline solution of a hop acid;

(b) adding an aqueous solution of a magnesium salt or a solid magnesium salt to obtain an organic layer or a precipitate;

(c) separating the organic layer or precipitate; and (d) drying the organic layer to obtain the solid magnesium salt.

Preferred is the process wherein said hop acid is selected from the group consisting of isoalpha acids, rho-isoalpha acids, tetrahydroisoalpha acids, and hexahydroisoalpha acids.

Also preferred is the process wherein said magnesium salt is selected from the group consisting of magnesium sulfate and magnesium chloride.

Also preferred is the process wherein the drying of step (d) is accomplished by a method selected from the group consisting of spray drying, vacuum drying drum drying, pan drying, rotary drying and freeze drying; and combinations thereof.

In another embodiment, the present invention is directed to a process for the production of the solid salt of a hop acid wherein said hop acid is selected from the group consisting of isoalpha acids, rho-isoalpha acids, tetrahydroisoalpha acids, hexahydroisoalpha acids and beta acids and said solid salt is selected from the group consisting of sodium, potassium, calcium, magnesium salts comprising basifying a heated aqueous solution of a hop acid and then drying the basified solution.

In another embodiment, the present invention is directed to a beer flavored by the addition of a solid salt of a hop acid or if said solid salt is only the calcium or magnesium salt of a beta acid, a blend of solid salts of hop acids.

DETAILED DESCRIPTION OF THE INVENTION

In present practice, hop acids such as alpha acids, beta acids, isoalpha acids, reduced isoalpha acids and the like have been converted into their potassium salt and sold as an aqueous alkaline solution of that salt. Physical stability problems are generally associated with the way these products are formulated. Some of these hop products can precipitate out of solution over time, making these products cumbersome to work with. By warming the above aqueous alkaline solution of any of these hop bittering products and treating the mixture with a salt, such as, for example, potassium carbonate, potassium bicarbonate, potassium chloride and the like, one can salt precipitate better than 70% of the hop bittering compounds. This precipitate is a flowable oil at warm temperatures. Removal of the residual water either by distillation, vacuum distillation, spray drying and the like provides a solid material. Typically the aqueous alkaline solution is warmed and diluted prior to addition to the kettle or added post fermentation. The novelty of the solid formulation allows for the shipping of hop bittering products, not water. Moreover, the solid salt can be weighed out and added to the kettle or the salt can be dissolved in water and added to the kettle or beer stream via post fermentation injection techniques.

This present invention is directed to solid salts of isoalpha acids having the formula

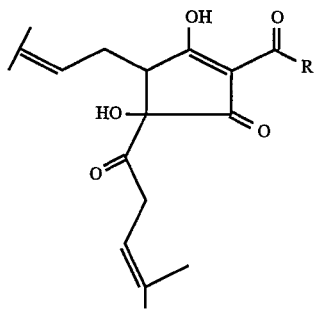

wherein R=isopropyl, isobutyl and sec-butyl.

The present invention is also directed to solid salts of reduced isoalpha acids, preferably tetrahydroisoalpha acids (THIAA) and hexahydroisoalpha acids (HHIAA) having the formula:

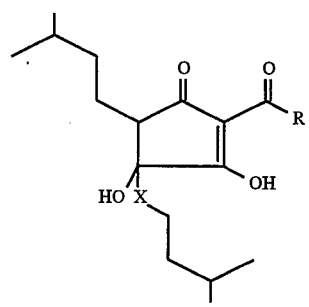

where X is C=O (THIAA) or CHOH (HHIAA) and R is isopropyl, isobutyl, and sec-butyl.

The present invention is directed to solid salts of rho-isoalpha acids having the formula

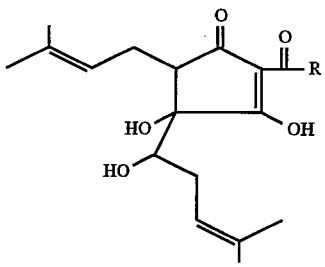

wherein R is isopropyl, isobutyl and sec-butyl.

Since the above compounds are produced from, for example, alpha acids and/or beta acids (which when extracted from hops exist as homologs, stereoisomers, optical isomers and combinations thereof), THIAA and rho-isoalpha acids HHIAA generally also exist as the corresponding homologs, stereoisomers, and optical isomers and combinations thereof.

The present invention is also directed to solid sodium and potassium salts of beta acids, also called lupulones and to solid salts of the oxidized form of these beta acids, called hulupones.

A solid salt of hop bittering compounds can be made from other alkali metal salts, alkaline earth metal salts and polyvalent metal salts. The potassium salt is the preferred metal because it easily dissolves in water. The above process can be performed at temperatures as low as 20° C. but the preferred temperature is between 65°–70° C. Salts such as potassium chloride, potassium bicarbonate, sodium chloride and the like can be used, however, potassium carbonate is preferred. The salt used to precipitate the hop compounds can be added as a solid, or as a solution. The final salt concentration should be about 0.5 M however somewhat better yields are seen when the molarity is $\leq 3.0$ M. Mixing for 30 minutes is sufficient and settling times of greater than 30 minutes provides good phase separation. The product can be dried by a variety of methods involving heat under reduced pressure, and the like. The total moisture content of the salt should be less than 2%.

The hop bittering compounds are either isolated via a series of aqueous alkaline extractions from hop extract or produced by thermal isomerization and or thermal isomerization-reduction of the alpha acids or beta acids. The resulting hop acids such as alpha acids, beta acids, isoalpha acids, reduced-isoalpha acids are then mixed with water and basified with potassium hydroxide and or potassium carbonate or the like to a pH above 5. The product is salt precipitated by adding a salt such as potassium carbonate, the salted oil is isolated and the residual water is removed by one of the previously mentioned drying conditions and a solid material is obtained. Having described the invention in general terms, reference is now made to specific examples. It is to understand that these examples are not meant to limit the present invention, the scope of which is determined by the appended claims.

EXAMPLE 1

8.01 liter of an aqueous alkaline solution containing 27.5% Isoalpha acids is blended with 3.5 liter of an aqueous 6 M Potassium Carbonate solution at 60° C. After stirring for 30 minutes the agitation was stopped and the mixture allowed to separate. Two layers formed, an upper concentrated organic layer and lower dilute aqueous layer. The lower aqueous phase was discarded and the upper concentrated phase 3.453 kilograms, 47.4% solids, was collected and spray dried yielding 1.19 kilograms of the a dry solid potassium salt containing 78.6% Isoalpha acids. A yield of 72.7% was calculated.

EXAMPLE 2

83.1 grams of an aqueous alkaline solution containing 27.5% Isoalpha acids was blended with 42 milliliter of an aqueous 6 M Potassium Carbonate solution at 60° C. After 30 minutes of stirring agitation was stopped and the mixture was allowed to separate. Two layers formed, an upper concentrated oil layer and lower aqueous layer. The lower aqueous phase was discarded and the upper concentrated oil phase, 33.7 grams, was collect. 7.0 grams of the upper oil phase was dried by rotary evaporation resulting in 5.82 grams of a dry solid potassium salt, containing 78.9% isoalpha acids. A yield of 96.7% was calculated.

EXAMPLE 3

51.7 grams of an aqueous alkaline solution containing 27.5% isoalpha acids was blended with 50 milliliter of an aqueous 6 M Sodium Chloride solution at 60° C. After 30 minutes agitation was stopped and the mixture allowed to separate. Two layers formed, a lower concentrated oil layer and an upper dilute aqueous layer. An additional 50 milliliter of the sodium chloride solution was added, and the mixture was blended for another 30 minutes. Agitation was stopped and the layers were allowed to separate resulting in an upper concentrated oil layer and a lower aqueous layer. The lower dilute aqueous phase was discarded and 39.42 grams of the upper concentrated phase recovered. 6.57 grams of the retained upper phase was then dried by rotary evaporation resulting in 5.30 grams of a dry solid sodium salt, containing 80.4% isoalpha acids. A yield of 92.8% was calculated.

EXAMPLE 4

100.0 grams of an aqueous alkaline solution containing 27.5% Isoalpha acids was blended with 50.0 milliliter of an aqueous 6 M Calcium Chloride solution at 20° C. Immediately upon addition of the Calcium Chloride solution copious amount of precipitate formed. After stirring for 30 minutes 55 milliliter of deionized water is added and the mixture is gravity filtered, with medium grade filter paper. Deionized water, 70 milliliter, was used for washing the precipitate on the filter. 237.6 grams of aqueous waste was discarded and 158.9 grams of wet precipitate was collected. 12.55 grams of the wet precipitate was vacuum oven dried resulting in 4.20 grams of a dry solid calcium salt, containing 50.6% Isoalpha acids. A yield of 97.8% was calculated.

EXAMPLE 5

7.0 liter of an aqueous alkaline solution containing 35% rho-isoalpha acids was blended with 3.5 liter of an aqueous 6 M potassium carbonate solution at 65° C. After stirring for 30 minutes agitation was stopped and the mixture allowed to separate. Two layers formed, an upper oil layer and lower aqueous layer. The lower aqueous phase was discarded and 3.79 kilograms of the upper oil phase was collected and spray dried. 2.81 kilograms of the dry solid potassium salt containing 73.8% rho-isoalpha acids was recovered. A yield of 84.6% was calculated.

EXAMPLE 6

54.03 grams of an aqueous alkaline solution containing 40.1% rho-isoalpha acids was blended with 26 milliliter of an aqueous 6 M Potassium Carbonate solution at 65° C. After stirring for 30 minutes agitation was stopped and the mixture allowed to separate. Two layers formed, an upper oil layer and lower aqueous layer. The lower aqueous layer was discarded and 29.26 grams of the upper oil layer was collected. 6.19 grams of this concentrated oil phase was rotary evaporated to dryness resulting in 5.28 grams of a dry solid potassium salt, containing 84.3% rho-isoalpha acids. A yield of 97.1% was calculated.

EXAMPLE 7

To 51.70 grams of an aqueous alkaline solution containing 40.1% rho-isoalpha acids was added 26 milliliter of an aqueous 6 M Sodium Chloride solution at 65° C. After stirring for 30 minutes the mixing was stopped and the layers allowed to separate. Two layers formed, a lower oil layer and an upper dilute aqueous layer. The upper dilute aqueous phase was discarded and 30.09 grams of the lower oil phase was collected. 5.20 grams of the oil material was dried by rotary evaporation resulting in 3.98 grams of a dry solid sodium salt containing 84.9% rho-isoalpha acids. A yield of 96.9% was calculated.

EXAMPLE 8

47.27 grams of an aqueous alkaline solution containing 40.1% rho-isoalpha acids was blended with 75 milliliter of an 2 M aqueous Magnesium Sulfate solution. Upon addition of the Magnesium Sulfate solution, copious amounts of precipitate were noted. This mixture was mixed for 30 minutes at 20° C., then gravity filtered through medium grade filter paper. The precipitate was washed with 113 milliliter of deionized water and 44.3 grams of the wet precipitate was collected. 6.75 grams of the precipitate was further dried in a vacuum oven at 50° C. and 30" Hg. 4.80 grams of the dried solid magnesium salt containing 54.5% rho-isoalpha acids was recovered. A yield of 95.1% was calculated.

EXAMPLE 9

20 liters of an aqueous alkaline solution, containing 10% Tetrahydroisoalpha acids was blended with 10 liters of an aqueous 6 M Potassium Carbonate solution at 5° C. After stirring for 30 minutes mixing was stopped and the mixture allowed to separate. Two layers formed, an upper concentrated oil layer and lower dilute aqueous layer. The aqueous phase was discarded and 2.8 kilograms of the upper concentrated oil phase was collected and spray dried. 1.77 kilograms of a dry solid potassium salt containing 82.4% Tetrahydroisoalpha acids was isolated. A yield of 72.9% was calculated.

EXAMPLE 10

100 milliliter of an aqueous alkaline solution containing 10% Tetrahydroisoalpha acids was blended with 50 milliliter of an aqueous 6 M Sodium Chloride solution at 65° C. After stirring for 30 minutes agitation was stopped and the mixture allowed to separate. Two layers formed, an upper concentrated oil layer and lower dilute aqueous layer. The lower dilute aqueous phase was discarded and 14.3 grams of the upper concentrated collected and dried by rotary evaporation. 9.2 grams of a dry solid sodium salt, containing 82.9% Tetrahydroisoalpha acids was recovered. A yield of 76.3% was calculated.

EXAMPLE 11

100 milliliter of an aqueous alkaline solution containing 10% Tetrahydroisoalpha acids was blended with 50 milliliter of an aqueous calcium chloride solution for 30 minutes at 20° C. Upon addition of the aqueous calcium chloride solution, copious amounts of precipitate formed. After 30 minutes of mixing the agitation was stopped and the mixture was gravity filtered through medium grade filter paper. 65.4 grams of the wet precipitate was collected and vacuum oven dried at 50° C. and 30" Hg. 42.7 grams of a dry solid calcium salt, containing 20.6% Tetrahydroisoalpha acids was recovered. A yield of 88.1% was calculated.

EXAMPLE 12

100 milliliter of an aqueous alkaline solution containing 10% Tetrahydroisoalpha acids was blended with 150 liter of an aqueous 2 M Magnesium Sulfate solution for 30 minutes at 20° C. Upon addition of the Magnesium Sulfate solution copious amounts of precipitate formed. After mixing for 30 minutes the mixture was filtered through medium grade filter paper and 76.9 grams of the wet precipitate was collected. The wet precipitate was further dried in a vacuum oven at 50° C. and 30" Hg. 27.4 grams of a dry solid magnesium salt containing 33.4% Tetrahydroisoalpha acids was collected. A yield of 91.5% was calculated.

EXAMPLE 13

51.30 grams of an aqueous alkaline solution containing 11.3% beta acids was blended with 32 milliliter of an aqueous 5 M Potassium Chloride solution at 20° C. After stirring for 30 minutes agitation was stopped and the mixture allowed to separate. Two layers formed, a lower, concentrated oil layer and an upper dilute aqueous layer. The upper phase was decanted and 13.66 grams of the lower oil phase was collected. 6.74 grams of the oil phase was dried by rotary evaporation producing 4.02 grams of a dry solid potassium salt, containing 64.9% beta acids. A yield of 91.2% was calculated.

EXAMPLE 14

100.40 grams of an aqueous alkaline solution containing 11.3% beta acids is blended with milliliter of an aqueous 6 M potassium carbonate solution at 20° C. After stirring for 30 minutes agitation was stopped and the mixture allowed to separate. Two layers formed, an upper concentrated oil layer and lower dilute aqueous layer. 152.8 grams of the lower dilute aqueous phase was discarded and 24.96 grams of the upper concentrated phase was then recovered, of which 4.92 grams was dried by rotary evaporation. 3.45 grams of a dry solid potassium salt, containing 63.1% beta acids was recovered. A yield of 97.3% was calculated.

EXAMPLE 15

93.12 grams of an aqueous alkaline solution containing 11.3% beta acids is blended with 62 milliliter an aqueous 5 M sodium chloride solution at 20° C. After stirring for 30 minutes agitation was stopped, and the mixture allowed to separate. Two layers formed, an upper dilute aqueous layer and lower concentrated oil layer. The aqueous phase was discarded and 21.16 grams of the lower oil phase was collected of which 5.11 grams was dried by rotary evaporation. 3.36 grams of a dry solid sodium salt containing 69.6% beta acids was recovered. A yield of 92.0% was calculated.

EXAMPLE 16

47.78 grams of an aqueous alkaline solution containing 15.5% hexahydroisoalpha acids is blended with 25 milliliter of an aqueous 6 M potassium carbonate solution at 60° C. After stirring for 30 minutes the agitation was stopped and the mixture allowed to separate. Two layers formed, an upper concentrated organic layer and a lower dilute aqueous layer. The lower aqueous phase was discarded and the upper concentrated oil phase, 9.98 grams, was collected. 4.92 grams of the upper oil phase was dried by rotary evaporation resulting in 3.84 grams of a dry solid potassium salt, containing 85.3% hexahydroisoalpha acids. A yield of 89.7% was calculated.

EXAMPLE 17

50.24 grams of an aqueous alkaline solution containing 15.5% hexahydroisoalpha acids was blended with 30 milliliter of an aqueous 5 M sodium chloride solution at 65° C. After stirring for 30 minutes the agitation was stopped and the mixture allowed to separate. Two layers formed, an upper concentrated organic layer and a lower dilute aqueous layer. The lower aqueous phase was discarded and the upper concentrated oil phase, 11.93 grams, was collected. 4.37 grams of the upper oil phase was dried by rotary evaporation, resulting in 2.88 grams of a dry solid potassium salt, containing 87.2% hexahydroisoalpha acids. A yield of 88.0% was calculated.

EXAMPLE 18

49.91 grams of an aqueous alkaline solution containing 15.5% hexahydroisoalpha acids is blended with 25 milliliter of an aqueous 6 M calcium chloride solution at 20° C. Immediately upon addition of the calcium chloride solution copious amount of precipitate formed. 50 milliliter of deionized water was added to aid in the mixing and after 30 minutes agitation was stopped. The precipitate was then gravity filtered with medium grade filter paper and washed with deionized water, 50 milliliter. 33.20 grams of wet precipitate was collected. 6.40 grams of the wet precipitate was vacuum oven dried resulting in 2.69 grams of a dry calcium salt, containing 53.9% hexahydroisoalpha acids. A yield of 97.2% was calculated.

EXAMPLE 19

52.00 grams of an aqueous alkaline solution containing 15.5% hexahydroisoalpha acids was blended with 75 milliliter of an aqueous 2 M magnesium sulfate solution at 20° C. Immediately upon addition of the magnesium sulfate solution copious amount of precipitate forms. After 30 minutes of mixing agitation was stopped. The precipitate was gravity filtered with medium grade filter paper and washed with deionized water, 50 milliliter. 50.13 grams of wet precipitate was collected. 8.37 grams of the wet precipitate was vacuum oven dried, resulting in 4.08 grams of a dry magnesium salt, containing 29.0% hexahydroisoalpha acids. A yield of 87.9% was calculated.

EXAMPLE 20

25.70 grams of an aqueous alkaline solution of the potassium salt of isoalpha acids containing 27.5% isoalpha acids was dried by rotary evaporation. 9.05 grams of the dry potassium salt containing 76.8% isoalpha acids was recovered. A yield of 98.3% was calculated.

EXAMPLE 21

27.20 grams of an aqueous alkaline solution, of the potassium salt of rho-isoalpha acids, containing 40.1% rho-isoalpha acids, was dried by rotary evaporation. 12.89 grams of the dry potassium salt, containing 93.4% rho-isoalpha acids was recovered. A yield of 98.6% was calculated.

EXAMPLE 22

44.14 grams of an aqueous alkaline solution of the potassium salt of tetrahydroisoalpha acids containing 10.0% tetrahydroisoalpha acids was dried by rotary evaporation. 5.11 grams of the dry potassium salt, containing 79.3% tetrahydroisoalpha acids was recovered. A yield of 98.5% was calculated.

EXAMPLE 23

31.60 grams of an aqueous alkaline solution of the potassium salt of hexahydroisoalpha acids containing 15.5% hexahydroisoalpha acids was dried by rotary evaporation. 5.52 grams of the dry potassium salt containing 86.2% hexahydroisoalpha acids was recovered. A yield of 97.1% was calculated.

We claim:

1. A process for the production of the solid potassium salt of a hop acid provided said hop acid is not an alpha acid or a hulupone comprising (a) heating an aqueous alkaline solution of a hop acid;
   (b) adding an aqueous solution of a potassium salt or a solid potassium salt to obtain an organic layer;
   (c) separating the organic layer; and
   (d) drying the organic layer to obtain the solid potassium salt.

2. A process according to claim 1 wherein said hop acid is selected from the group consisting of isoalpha acids, rho-isoalpha acids, tetrahydroisoalpha acids, hexahydroisoalpha acids and beta acids.

3. A process according to claim 1 wherein said potassium salt is potassium carbonate.

4. A process according to claim 1 wherein the drying of step (d) is accomplished by a method selected from the group consisting of spray drying, vacuum drying, drum drying, pan drying, rotary drying and freeze drying, and combinations thereof.

5. A process for the production of the solid sodium salt of a hop acid provided said hop acid is not an alpha acid or a hulupone comprising (a) heating an aqueous alkaline solution of a hop acid;
   (b) adding an aqueous solution of a sodium salt or a solid sodium salt to obtain an organic layer;
   (c) separating the organic layer; and
   (d) drying the organic layer to obtain the solid sodium salt.

6. A process according to claim 5 wherein said hop acid is selected from the group consisting of isoalpha acids, rho-isoalpha acids, tetrahydroisoalpha acids, hexahydroisoalpha acids and the beta acids.

7. A process according to claim 5 wherein said sodium salt is sodium carbonate.

8. A process according to claim 5 wherein the drying of step (d) is accomplished by a method selected from the group consisting of spray drying, vacuum drying, drum drying, pan drying, rotary drying and freeze drying, and combinations thereof.

9. A process for the production of the solid calcium salt of a hop acid provided said hop acid is not a beta acid, comprising (a) heating an aqueous alkaline solution of a hop acid;
   (b) adding an aqueous solution of a calcium salt or a solid calcium salt to obtain an organic layer;
   (c) separating the organic layer; and
   (d) drying the organic layer to obtain the solid calcium salt.

10. A process according to claim 9 wherein said hop acid is selected from the group consisting of isoalpha acids, rho-isoalpha acids, tetrahydroisoalpha acids, and hexahydroisoalpha acids.

11. A process according to claim 9 wherein said calcium salt is calcium carbonate and calcium chloride.

12. A process according to claim 9 wherein the drying of step (d) is accomplished by a method selected from the group consisting of spray drying, vacuum drying, drum drying, pan drying, rotary drying and freeze drying, and combinations thereof.

13. A process for the production of the solid magnesium salt of a hop acid provided said hop acid is not a beta acid, comprising (a) heating an aqueous alkaline solution of a hop acid;
   (b) adding an aqueous solution of a magnesium salt or a solid magnesium salt to obtain an organic layer or a precipitate;
   (c) separating the organic layer; and
   (d) drying the organic layer to obtain the magnesium salt.

14. A process according to claim 13 wherein said hop acid is selected from the group consisting of isoalpha acids, rho-isoalpha acids, tetrahydroisoalpha acids, and hexahydroisoalpha acids.

15. A process according to claim 13 wherein said magnesium salt is magnesium sulfate.

16. A process for the production of the solid salt of a hop acid wherein said hop acid is selected from the group consisting of isoalpha acid, rho-isoalpha acid, tetrahydroisoalpha acids, hexahydroisoalpha acids and said solid salt is selected from the group consisting of sodium, potassium, calcium, magnesium salts comprising basifying a heated aqueous solution of a hop acid and then drying the basified solution.

17. A beer flavored by the addition of a solid salt of a hop acid, or if said solid salt is only the calcium or magnesium salt of a beta acid, a blend of solid salts of hop acids.

* * * * *